(12) United States Patent
Banerjee et al.

(10) Patent No.: US 12,288,159 B2
(45) Date of Patent: Apr. 29, 2025

(54) DEEP LEARNING BASED CONTEXT EMBEDDING APPROACH FOR DETECTING DATA ENTRY ERRORS

(71) Applicant: Intuit, Inc., Mountain View, CA (US)

(72) Inventors: Arkadeep Banerjee, Bangalore (IN); Vignesh T. Subrahmaniam, Bangalore (IN)

(73) Assignee: Intuit Inc., Mountain View, CA (US)

( * ) Notice: Subject to any disclaimer, the term of this patent is extended or adjusted under 35 U.S.C. 154(b) by 22 days.

(21) Appl. No.: 18/122,633

(22) Filed: Mar. 16, 2023

(65) Prior Publication Data
US 2024/0311630 A1 Sep. 19, 2024

(51) Int. Cl.
*G06N 3/08* (2023.01)
(52) U.S. Cl.
CPC .................... *G06N 3/08* (2013.01)
(58) Field of Classification Search
CPC ....................................................... G06N 3/08
See application file for complete search history.

(56) References Cited

U.S. PATENT DOCUMENTS

| | | | | |
|---|---|---|---|---|
| 9,959,272 B1* | 5/2018 | Canek | ............... | G06F 40/58 |
| 2017/0236060 A1* | 8/2017 | Ignatyev | ............... | G06N 5/01 |
| | | | | 706/46 |
| 2018/0007070 A1* | 1/2018 | Kulkarni | ............... | H04L 63/1425 |
| 2021/0232908 A1* | 7/2021 | Xian | ............... | G06N 3/045 |
| 2023/0010686 A1* | 1/2023 | Lesh | ............... | G16H 50/70 |
| 2023/0101817 A1* | 3/2023 | Sinha | ............... | G06F 16/93 |
| | | | | 707/722 |

OTHER PUBLICATIONS

Zhang, X. et al., "Character-level Convolutional Networks for Text Classification", https://arxiv.org/abs/1509.01626 (Year: 2016).*
Dos Santos, C. et al., "Boosting Named Entity Recognition with Neural Character Embeddings", https://aclanthology.org/W15-3904/ (Year: 2015).*
Soni, S., et al., "TextConvoNet: a convolutional neural network based architecture for text classification", https://link.springer.com/article/10.1007/s10489-022-04221-9 (Year: 2022).*
Naseem, U. et al., "Transformer based Deep Intelligent Contextual Embedding for Twitter sentiment analysis", https://www.sciencedirect.com/science/article/pii/S0167739X2030306X?via%3Dihub (Year: 2020).*

* cited by examiner

*Primary Examiner* — Alexey Shmatov
*Assistant Examiner* — Devika S Maharaj
(74) *Attorney, Agent, or Firm* — Dinsmore & Shohl LLP

(57) ABSTRACT

Certain aspects of the present disclosure provide techniques for detecting data entry errors. A method generally includes receiving a string value as user input for a data field, selecting a plurality of reference values previously entered into the data field within a time period, processing, with an embedding model configured to classify an input string value as a valid or invalid entry, the string value and the reference values and thereby generating a first vector as output, computing one or more statistics for the reference values and the string value, creating a second vector based on the one or more statistics, generating a concatenated vector by concatenating the first vector and the second vector, processing, with a classifier model configured to classify the string value as valid or invalid, the concatenated vector and thereby generating a classification output, and taking action based on the classification output.

14 Claims, 7 Drawing Sheets

DEEP LEARNING BASED CONTEXT EMBEDDING APPROACH FOR DETECTING DATA ENTRY ERRORS

INTRODUCTION

Aspects of the present disclosure relate to machine learning, and in particular to training and using machine learning models to detect errors in numeric data.

BACKGROUND

Manual data entry is a ubiquitous task in many different data processing contexts, including engineering, healthcare, education, government, mathematics, and finance, to name a few. However, a notable problem with manual data entry is the inevitability of mistakes, such as mistyped words and numbers, which may in-turn lead to mistaken processing. Best intentions aside, even the most meticulous individuals make occasional data entry mistakes.

While data entry errors may seem routine and mostly innocuous in day-to-day life, in high-risk industries (e.g., healthcare, finance, engineering, science, transportation, etc.), a data entry error may lead to serious injury, loss of life, loss of assets, destruction of property, legal liability, and the like. Accordingly, there is a need for a technical solution for detecting data entry errors so that they can be corrected and bad outcomes can be avoided.

Conventional approaches for detecting data entry errors have focused on non-numeric type data types. For example, a spell checking function may check a word entered in an application (e.g., in a data field) against a reference dictionary to determine whether the word is spelled correctly. However, dictionary-based spell checking can still fail to detect word-based errors where, for example, a correctly spelled word is nevertheless the wrong word for the context. For example, the words "there," "their," and "they're" are notoriously misused, and spell checking will not catch these context-type errors. Another approach is to constrain data entry, such as by using a list of available entry options (e.g., a drop-down list). However, such approaches significantly constrain the range of input data values possible and thus are not a realistic solution for many data processing contexts.

Techniques for detecting errors in numeric data present a more difficult technical problem. Approaches for detecting errors in non-numeric data, such as dictionary-based approaches, are generally unsuitable for numeric data types. And constraining the range of input data is often not workable for precise numeric data. Further, performing manual checks of numeric data is infeasible beyond the very small scale—and often just as error prone as the original data entry. Thus a technical problem exists in the art of how to detect errors in numeric data, such as numeric data entered into a data processing application.

Accordingly, improved techniques for detecting errors in numeric data are needed.

SUMMARY

Certain embodiments provide a method for detecting data entry errors. The method generally includes receiving a string value as user input for a data field. The method generally includes obtaining a plurality of reference values associated with the data field. The method generally includes processing, with a context embedding model configured to classify an input string value as valid or invalid, the string value and the plurality of reference values and thereby generating a first vector as output. The method generally includes obtaining a plurality of recent values previously entered into the data field within a time period. The method generally includes computing one or more statistics for the plurality of recent values. The method generally includes creating a second vector based on the one or more statistics and the string value. The method generally includes generating a concatenated vector by concatenating the first vector and the second vector. The method generally includes processing, with a classifier model configured to classify the string value as valid or invalid, the concatenated vector and thereby generating a classification output. The method generally includes taking one or more actions based on the classification output.

Certain embodiments provide a method for training machine learning models to detect data entry errors. The method generally includes obtaining a plurality of training data instances. Each of the plurality of training data instances comprises: a training input comprising a string value and a plurality of reference values, wherein the string value comprises an accurate value previously entered for a data field or an error value for the data field and a training output comprising an indication that the string value is valid or invalid. The method generally includes training a context embedding model to classify an input string value as valid or invalid and thereby generate a first vector as output using the plurality of training data instances. The method generally includes, for each training data instance of the plurality of training data instances, extracting the first vector generated using the context embedding model, computing one or more statistics for the plurality of reference values of the corresponding training data instance, creating a second vector based on the one or more statistics, and generating a concatenated vector by concatenating the first vector and the second vector. The method generally includes training a classifier model to classify the input string value as valid or invalid and thereby generate a classification output using one or more of the concatenated vectors generated for each of the plurality of training data instances.

Certain embodiments provide a method for training machine learning models to detect data entry errors.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
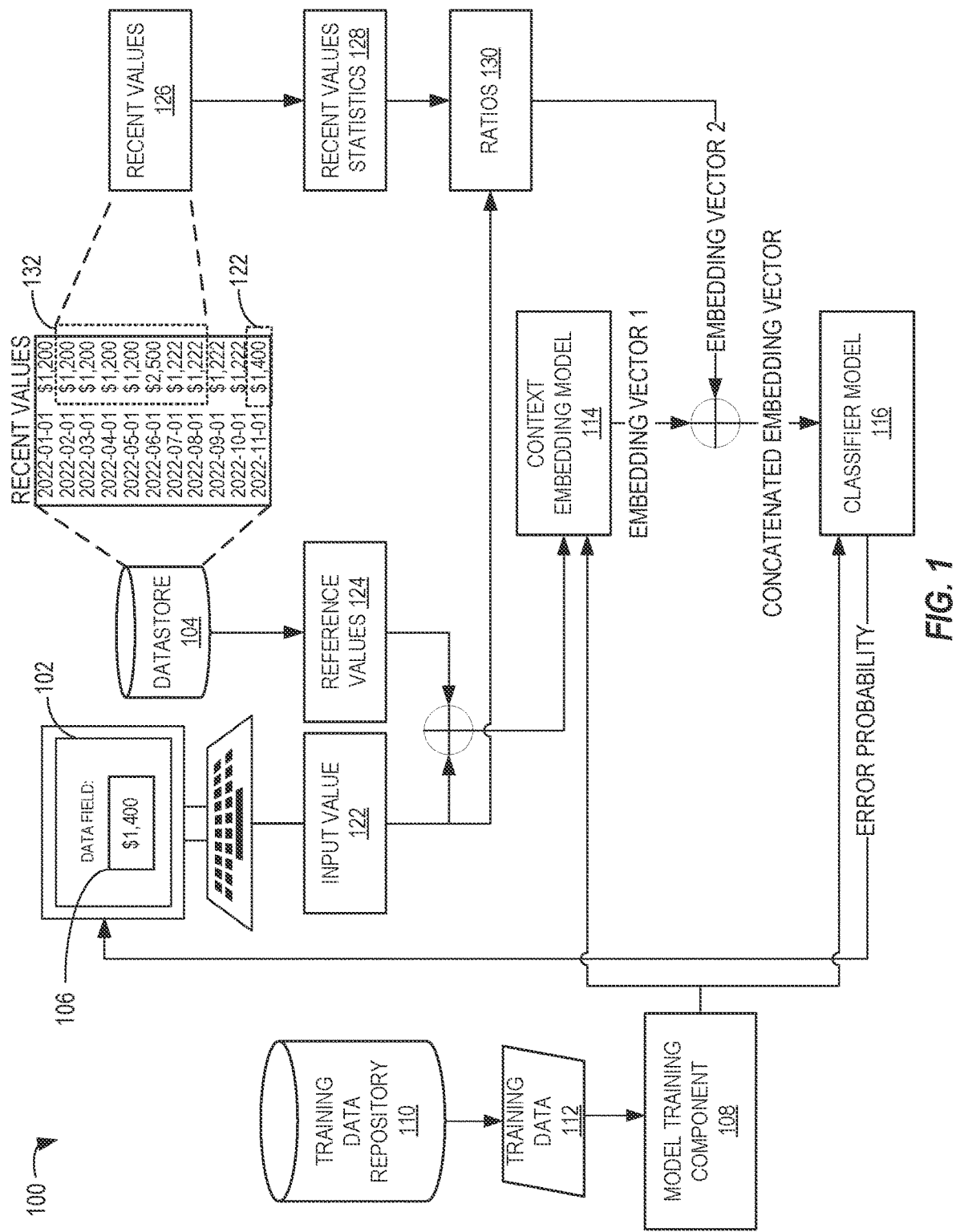
FIG. 1 illustrates an example system configured for detecting errors in numeric data.

Detecting errors in numeric data (e.g., for numeric data entered into an application for processing) is a technically challenging problem. One aspect of the technical problem is that many types of numeric data entry errors exist, which are generally not detectable using known techniques—especially those techniques designed for non-numeric data. One example of a numeric data entry error is a transposition error, which occurs when a string of numbers is encoded in the wrong order, such as "101" instead of "110". Another example of a numeric data entry error is a duplication error, which occurs when a number is erroneously entered more than once, such as "100" instead of "10." Yet another example of a numeric data entry error is an omission error, which occurs when a number in a string of numbers is omitted, such as "10" instead of "100". A further example of a numeric data entry error is a substitution error, which occurs when a number in a string of numbers is erroneously substituted for another number, such as "120" instead of "110." These are some examples of typographical errors, but other types of numeric errors exist. For example, a logical error may occur when cutting and pasting an otherwise correct numeric value into an incorrect data field (e.g., pasting a zip code in a salary field).

As above, manually checking whether each number in a string of numbers associated entered into a data field is correct prior to performing data processing is cumbersome, time-consuming, and generally impractical for any large scale data processing. In fact for large data sets, the technical problem is intractable when considering manual (e.g. human-based mental process) approaches. When a data set is sufficiently large, it could take a human longer than its lifetime to check all the numeric data entries.

Further, statistical approaches for detecting errors in numeric data, such as Z-tests and outlier detection, may rely on assumptions that are not valid for many types and/or sets of numeric data. For example, numeric hypothesis testing is generally based on an assumption that each numeric data instance being tested is independently and identically distributed (IID), which is decidedly untrue for many data fields. For example, a time series of numeric data values, such as a person's year-to-date pay from one month to the next, would not be IID.

As yet another technical issue, numeric data errors may have low divergence from a population of data in which they reside. For example, "12345" has a statistically small divergence from "12354" despite a high probability of occurring in data entries due to human factors, such as the numbers '4' and '5' being adjacent to each other on keyboards and number pads used for data entry. Even when there is a large divergence from a population, the divergent data may in fact be valid. For example, if a person's pay is $10,000 per month for months January through November and then $19,000 for December, the December value appears both statistically divergent and easily explainable based on a common typographical error of substituting adjacent numbers '9' and '0' on a keyboard. However, December's pay may have included a bonus of $9,000 and therefore be valid despite all of the indications of it being an error based on conventional error detecting techniques.

Accordingly, conventional methods for detecting errors in numeric data, such as statistical tests and other rule-based approaches, are not effective for detecting numeric data errors in many contexts.

Embodiments described herein overcome these technical problems by utilizing artificial intelligence (AI)-driven error detection models that generally include an embedding component (e.g., a machine learning-based context embedding model, such a CNN) and a classification component (e.g., a machine learning-based classifier model, such as a gradient boosted classifier). Using this two-part model architecture, the error detection models described herein leverage deep learning and natural language processing-based context embedding to improve error detection performance by, for example, (1) accounting for the nature of the numeric data being checked for errors (e.g., whether it is a salary or price of an item); (2) creating a reference set of related numeric values (e.g., past numeric values entered in the same data field); and (3) learning to predict the probability of an error in numeric data based on treating the numeric data as both a numeric value (e.g., 101) and a string of individual number characters (e.g., '1'-'0'-'1'). In other words, a single numeric data instance, as a tuple of its numeric value and a string (or sequence) of characters (e.g., individual numbers), with reference to the reference set of related numeric values for the same data field (e.g., reference values and the numerical value horizontally stacked as a sequence of numbers where each number is separated by a pipe "|") is used as model input data for error detection.

As described in more detail below, reference data related to the data being checked for errors are used to generate various statistics, which can then be used as features of an input data vector for predicting errors. Beneficially, the statistics provide context for the particular data instance being checked for errors.

Further, the string of number characters for the data being checked for errors is processed using a feature extracting machine learning model, such as a character level 1-dimensional convolutional neural network (CNN), to generate an embedding. The embedding is then concatenated with the statistics and the concatenated data is then processed by a classification component of the overall model architecture to generate a classification of, for example, valid or invalid data. In some cases, the classification component is a gradient boosted classifier.

The error detection models described herein thus provide significant technical advantages over conventional solutions, such as improved error detection accuracy for numeric data types and the ability to perform error detection on a wider variety of input data. These technical effects overcome technical problems of low error detection accuracy and limited data processing capabilities in conventional approaches. For example, the error detection models described herein need not assume that a numeric data instance being tested is IID, like conventional approaches, and thus provide a technical advantage over those conventional approaches.

Notably, the improved error detection models described herein can further improve the function of any existing application that process numeric data. For example, any application that includes numeric data fields and/or numeric data fields. In some cases, a numeric data instance can be checked after entry and can be indicated as a potential error to a user if the error detection model output (e.g., a probability of error) exceeds a threshold. In this way, the user receiving the indication can correct the numeric data and avoid any problems that would have otherwise been created by the error. Thus, the indication generated based on the error detection model output, a further technical effect of the model architectures described herein, can beneficially help to avoid a wide range of significant harms.

Example Deep Learning Based Context Embedding Approach for Detecting Data Entry Errors FIG. 1 illustrates an example system 100 configured for detecting errors in numeric data (e.g. in data entered into or otherwise processed by an application), according to embodiments of the present disclosure.

In the following discussion, a "string value" may generally refer to a string of input data (e.g., data input into a data field, such as 106) comprising multiple numeric characters. For example, the string value "101" represents a numeric value of 101 and includes a character string of '1'-'0'-'1'.

Figure 2A:
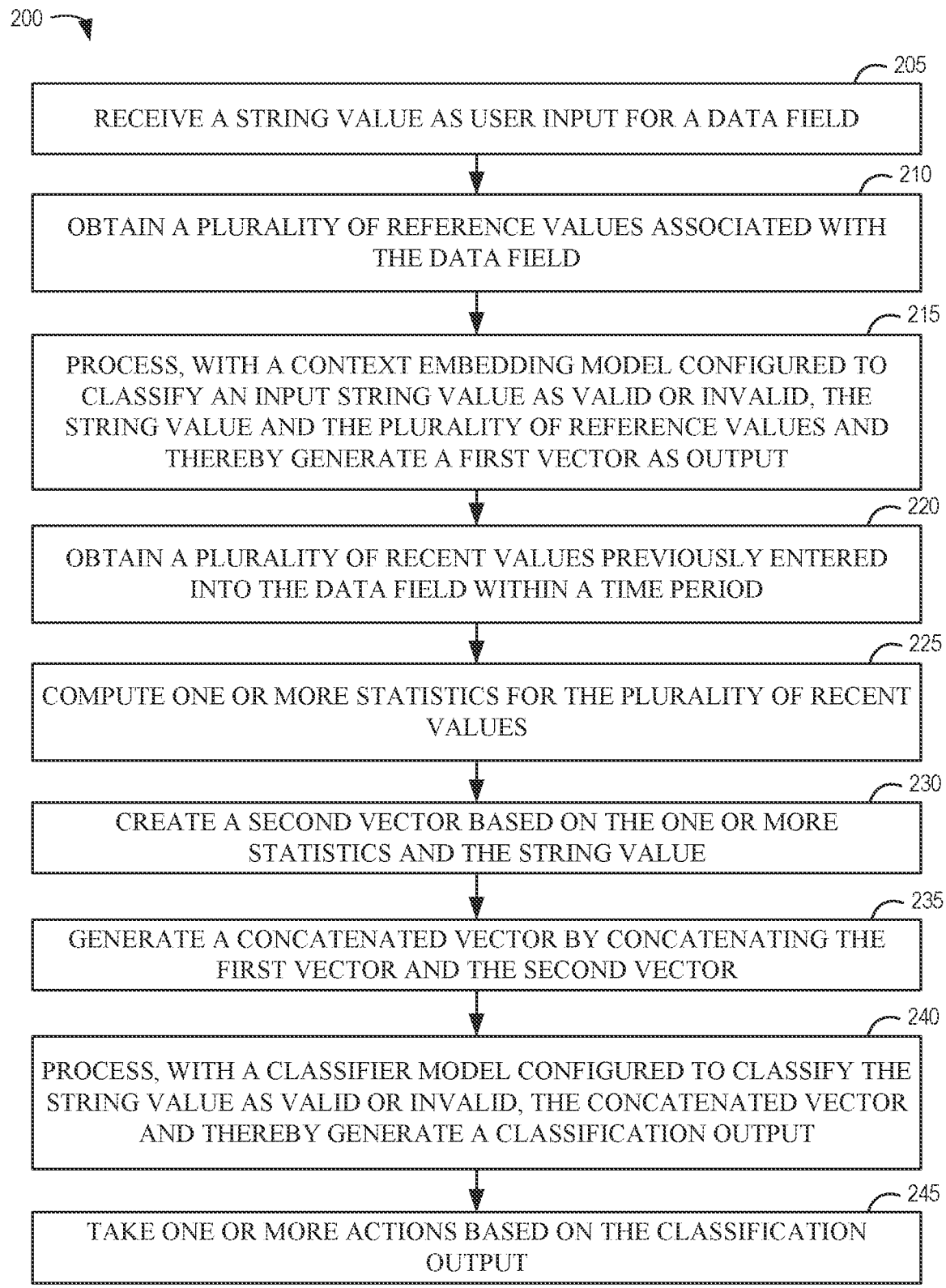
FIGS. 2A and 2B illustrate example methods for detecting errors in numeric data using trained machine learning models.
Figure 2B:
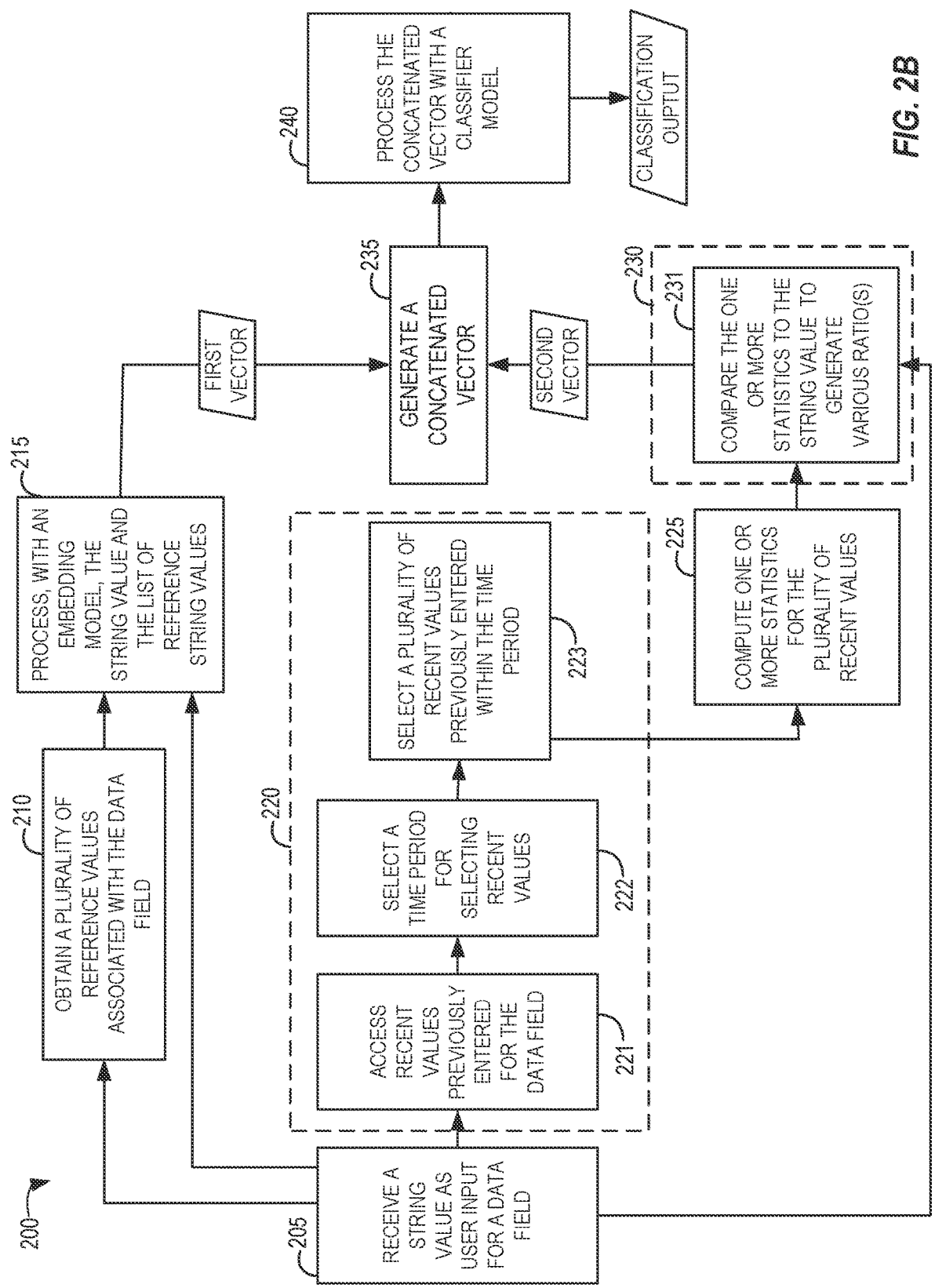

Example system 100 includes a user interface 102 with a data field 106, a datastore 104, a model training component 108, a training data repository 110, a context embedding model 114, and a classifier model 116. Collectively, context embedding model 114 and classifier model may be components of and referred to as a numeric error detection model or model architecture configured for detecting errors in numeric data. FIGS. 2A and 2B, described in detail below, illustrate an example method that may be performed using context embedding model 114, classifier model 116, input value 122, reference values 124, recent values 126, recent values statistics 128, and ratios 130 illustrated in FIG. 1, for detecting numeric data errors (e.g., numeric data entered into a field of an application). Further, FIGS. 3A-3C, described in detail below, illustrate an example method that may be performed by model training component 108 using training data 112 stored in training data repository 110 illustrated in FIG. 1, for training context embedding model 114 and classifier model 116 to detect numeric data errors.

In some embodiments, context embedding model 114 is an artificial neural network (ANN) configured to generate an embedding based on its input data. ANNs generally include a plurality of connected units or nodes called artificial neurons. Each node generally has one or more inputs with associated weights, a net input function, and an activation function. Nodes are generally included in a plurality of connected layers, where nodes of one layer are connected to nodes of another layer, with various parameters governing the relationships between nodes and layers and the operation of the neural network. As described above, the layers may include an input layer, one or more hidden layers, and an output layer. Generally, one of the hidden layers, such as the penultimate layer before the output layer, may be used as an embedding layer that generates, for example, a vector embedding based on the processing of all preceding layers in the ANN. In the example of FIG. 1, the output of context embedding model 114 is referred to as "embedding vector 1" or "first vector", which may also be referred to as a reference value embedding vector.

In one example, context embedding model 114 is a one-dimensional convolutional neural network (CNN) that processes input data (e.g., a string value) at a character level (e.g., as a number by number sequence). Generally, a CNN is a class of neural network model that includes at least one convolutional layer, which is a layer that may compress or expand the dimensionality of input data. A CNN may also include other layer types, such as pooling layers, fully-connected layers, an output layer and others. CNNs are useful for extracting information (e.g., features) from input data, and are thus commonly used for computer vision, speech, text, and/or similar data processing tasks. A character-level CNN is a type of CNN configured to treat text each individual character of an input string as an individual input signal.

In some embodiments, classifier model 116 is a gradient boosted model. Gradient boosting is generally a machine learning technique used in regression and classification tasks in which a model output (e.g., prediction or inference) is generated by an ensemble of relatively weaker prediction models. In some cases, the underlying models are decision trees, in which case the classifier model may be referred to as a gradient boosted tree model.

Figure 3A:
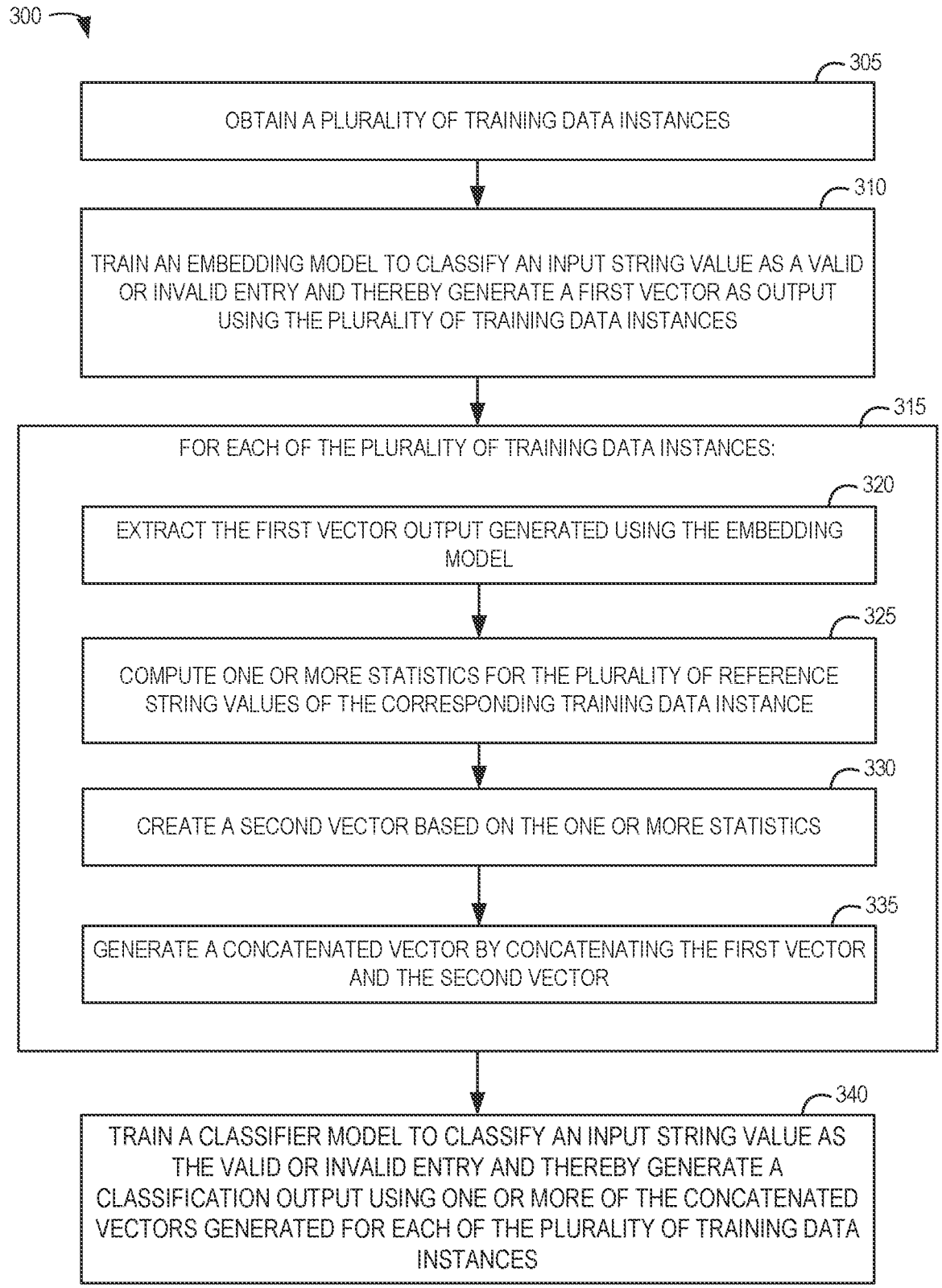
FIGS. 3A-3C illustrate an example method for training machine learning models to detect errors in numeric data.
Figure 3B:
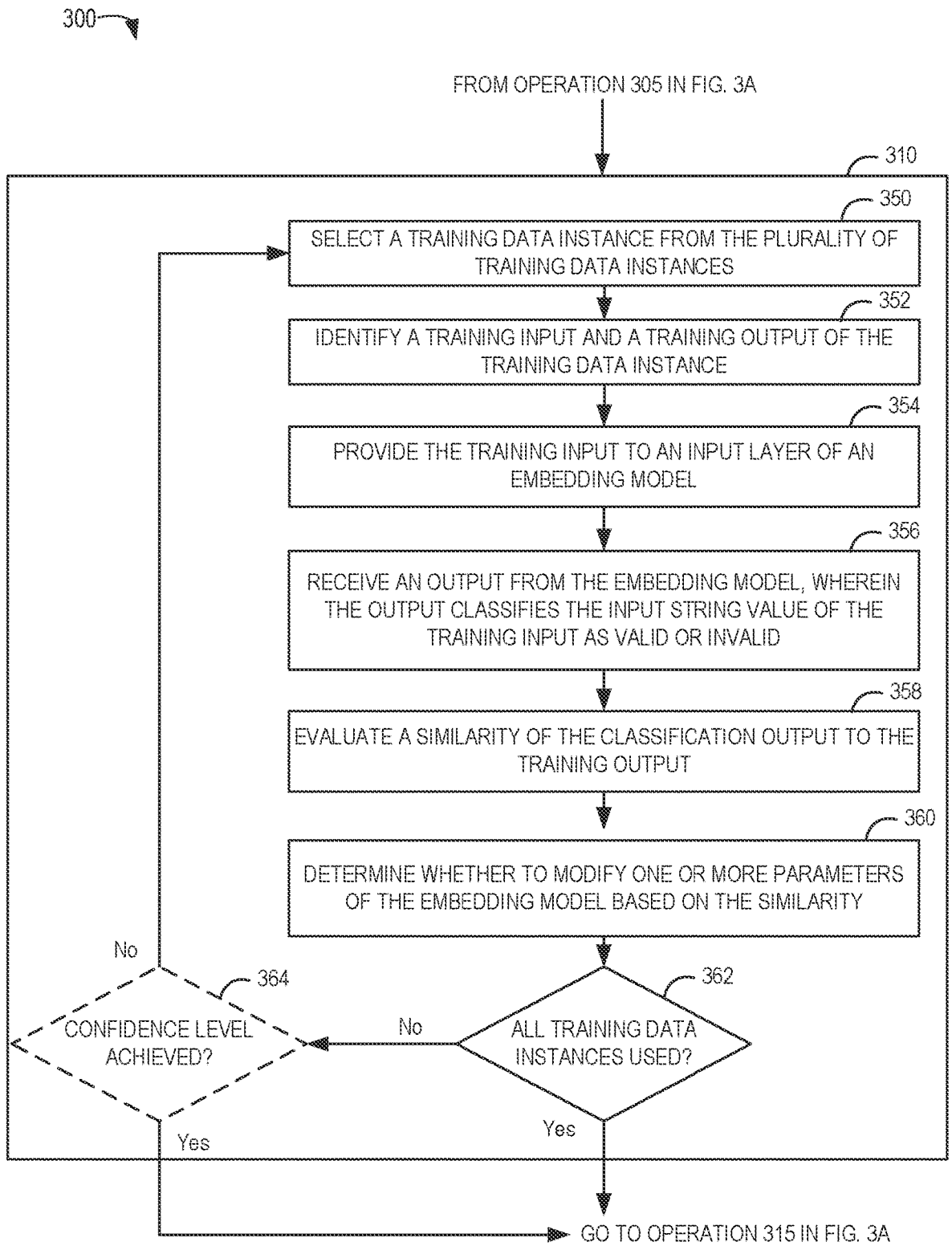
Figure 3C:
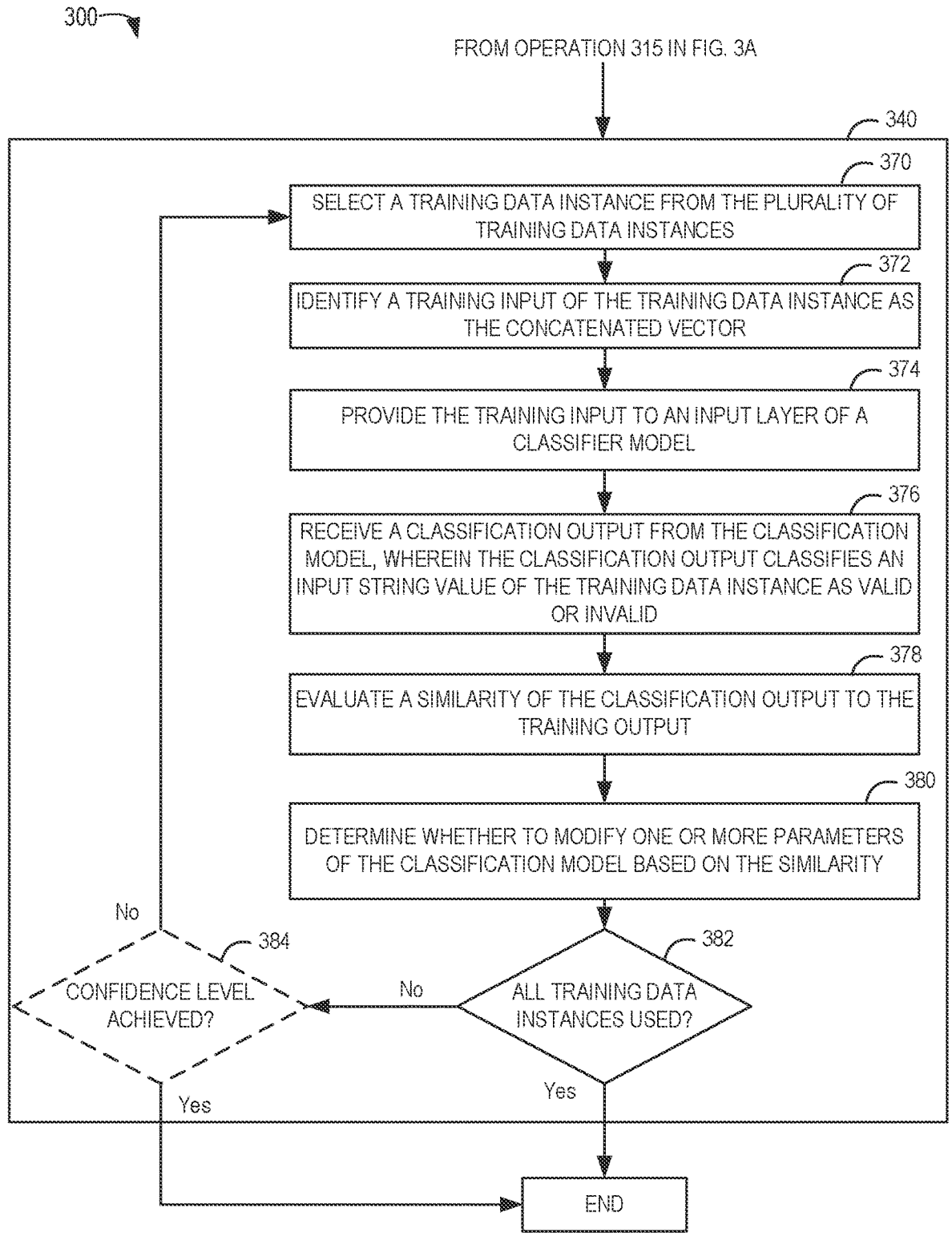

Model training component 108 is generally configured to train context embedding model 114 and classifier model 116. FIGS. 3A-3C describe examples of training methods that may be used by model training component 108. In certain embodiments, model training component receives training data 112 from training data repository 110, and uses training data 112 to train context embedding model 114 and classifier model 116.

Training data 112 for context embedding model 114 may include, for example a plurality of training data instances, where each of the plurality of training data instances includes a training input and a training output (often referred to as a label). The training input may be based on an input string (or target string) for a data field (e.g., 106), such as input value 122, and a set of reference values (e.g., reference values 124) for that data field. In some cases, the reference values are based on previous values for the data field (e.g., stored in datastore 104). For example, the reference values may include various values, such as recent values, mode value, median value, max value, minimum value, unique value, and others for the data field. Further, reference values 124 may be associated with one or more attributes. For example, company and employee attributes could be associated with a wage input string. As another example, company and item attributes could be associated with an item price value. As such, reference values may be drawn within a given context of what is being monitored (e.g., context for a data field), an end user, and/or functionality. For example, while monitoring the "item quantity" for an invoice page, reference values may include a historic collection of values particular for a given end user and for "item quantity" values only. The training output may include an indication that the input string is valid or invalid (e.g., a valid label or an invalid label). Note that once deployed, the final layer of context embedding model 114 may be removed so that its output is a vector embedding rather than a prediction of validity.

Training data 112 for classifier model 116 may also include a plurality of training data instances including a training input and a training output. In some embodiments, the training input for classifier model 116 is a concatenated vector based on: (1) an embedding (e.g., a vector) generated by context embedding model 114 for a particular input string; and (2) a second vector generated based on statistics (e.g., recent values statistics 128) associated with recent values for the data field (e.g., recent values 126). In some cases, the recent values may be determined based on a configurable window (e.g., window 132) of recent values, window spanning a time interval of a time-series of data, or a window spanning a number of recent values (e.g., the 10 most recent values, or the $2^{nd}$ through $8^{th}$ most recent values). Note that values between input value 122 and the values within window 132 may be considered within a training cadence window. In some cases, the configurable window 132 is based on the training cadence window. The training cadence window represents a lead time between when classifier model 116 is deployed for detecting numerical data errors and when classifier model 116 is retrained (e.g., where classifier model 116 is retrained every week, then the training cadence window is equal to seven days). As such, classifier model 116 is trained to classify inputs values with reference values older than the training cadence window (e.g., for the given example, older than seven days). In certain embodiments, the training cadence window is user selected, and in some cases, differs per company. In certain embodiments, the training cadence window is determined based on deteriorating model performance metrics over time.

Synthetic training data may be generated to improve the training of context embedding model 114 and/or classifier model 116. Synthetic training data is data that is artificially generated rather than produced by real-world events (e.g., data entries made by users). For example, synthetically-generated training data may include training inputs with errors that are known to occur and therefore are predictable, such as the various typographical errors discussed above (e.g., transposition errors, duplication errors, omission errors, substitution errors, and others) as well as logical errors.

For example, assume input value 122 ("1,400") is a valid data entry. Various invalid values may be synthetically generated based on the valid value, such as "1,040" and "4,100" to represent cases where a user inadvertently entered the numbers of the value in the wrong order, or "14,000" and "1,440" to represent cases where a user inadvertently entered one or more characters of the value more than once (e.g., duplication errors), or "100" and "2,100" to represent cases where a user inadvertently entered a value intended for a different data field (e.g., logical errors), and others.

Once context embedding model 114 and classifier model 116 are trained, system 100 may process incoming data and predict when that data includes numeric errors.

For example, a user may enter "$1,400" as a string value in data field 106 within user interface 102 from which an input value 122 (e.g., "1,400") may be extracted. Reference values 124 may be retrieved from datastore 104 (e.g., having been saved during training) based on attributes of input value 122. Input value 122 and reference values 124 may be combined into an input for context embedding model 114. For example, input may include the reference values 124 and the input value 122 horizontally stacked as a sequence of numbers, with input value 122 as the last number in the sequence, where each number is separated by a pipe "|". Context embedding model then processes the input data and generates a first embedding vector (depicted as "embedding vector 1"), which may be referred to as a reference value embedding vector.

Next, recent values 126 based on the configurable window 132 may be extracted (e.g., from datastore 104) and recent value statistics 126 may be generated. For example, the recent value statistics may include recent values, mode value, median value, max value, minimum value, unique value, and others.

Recent value statistics 128 may be compared against input value 122 to generate various ratios 130, such as mean ratio, median ratio, likelihood ratio test (LRT) ratio, Z-scores, and others. For example, the value "1,400" may be divided by the mean of the recent values to generate the mean value ratio. Generating various ratios 130 may be used to enable a framework capable of including any well-defined test ratios as part of a concatenated embedding vector used as input into classifier model 116, as described below. Further, generating various ratios 130 may also help to normalize the data for model processing when considering data of many different scales.

Embedding vector 2 (or "second vector") may thus be based on input value 122, recent value statistics 128, and ratios 130.

The output of context embedding model 114 (embedding vector 1) and embedding vector 2 are concatenated to form a concatenated embedding vector. The concatenated embedding vector is a horizontal concatenation of embedding vector 1 and embedding vector 2. The concatenated embedding vector is a one-dimensional (1-D) vector. The concatenated vector is processed by classifier model 116 to generate a prediction, such as an error probability or classification (e.g., valid or not valid). The output of classifier model 116 may then be used by an application, such as the application presenting user interface 102, to present an indication to a user that a value entered into a data field (e.g., 106) may be incorrect so that the user may correct or otherwise verify the value. Beneficially, the concatenated embedding vector includes features encoding information from the reference values 124 as well as recent values 126, which improves the performance of classifier model 116.

Note that while various aspects of system 100 are shown separately, such as user interface 102, context embedding model 114, and classifier model 116, these and other aspects may be a part of or implemented by a single processing system. In other examples, these various aspects may be split among processing systems that are in data communication with one another, such as via a network connection. For example, user interface 102 may be a part of a user device and context embedding model 114 and classifier model 116 may be deployed on a server device, such as an application server, interacting with user interface 102 in a client-server architecture.

Example Method for Detecting Errors in Numeric Data

FIG. 2A is a flow diagram illustrating example steps of a method 200 for detecting errors in numeric data using trained machine learning models, such as context embedding model 114 and classifier model 116 of FIG. 1. FIG. 2B is a workflow illustrating similar steps of method 200 in more detail, including illustrating relationships between various steps and the possibility for parallelizing the processing of various steps. FIGS. 2A and 2B are described in conjunction below.

As illustrated in FIGS. 2A and 2B, method 200 begin, at step 205, with receiving a string value (e.g., 122 in FIG. 1) as user input for a data field (e.g., 106 in FIG. 1), such as via graphical user interface 102 in FIG. 1. For example, let the input string value "$1,400" represent an amount to be paid to an employee for the month of December 2022.

Method 200 proceed to step 210 with selecting a plurality of reference values (e.g., 124 in FIG. 1) associated with the data field. As above, the reference values may include recent values as well as statistical values based on the recent values.

Method 200 then proceeds to step 215 with processing the string value and the reference values and thereby generating a first vector (e.g., reference value embedding vector) as output. The string value and the reference values may be processed using a context embedding model, such as context embedding model 114 in FIG. 1. The generated first vector may be a vector extracted from an embedding layer of context embedding model 114. In particular, the string value and its reference values are horizontally stacked as a sequence of numbers (e.g., where each number is separated by a pipe "|") and passed through a trained context embedding model to obtain an embedding after flattening an output of the last layer of the model before a fully-connected layer of the model.

Method 200 then proceeds to step 220 with obtaining a plurality of recent values (e.g., 126 in FIG. 1) previously entered into the data field within a window (e.g., 132 in FIG. 1). As above, the window spans a time interval of a time-series of data or spans a number of recent values. In the example workflow illustrated in FIG. 2B, obtaining the plurality of recent values at 220 involves steps 221, 222 and 223.

Specifically with respect to FIG. 2B, step 221 includes accessing recent values previously entered for the data field in a datastore, such as datastore 104 illustrated in FIG. 1.

Step 222 includes selecting a window (time period or other reference range, such as a set of indices) for selecting recent values. In certain embodiments, the window is selected based on a training cadence of a context embedding model (e.g., 114 in FIG. 1). As described herein, the training cadence window may be user selected, and in some cases differ per company and/or may be determined based on deteriorating model performance metrics over time.

Step 223 includes selecting a plurality of recent values 124 previously entered into the data field 106 within the selected time period.

Using the above example (also illustrated in FIG. 1), at step 221 the ten most recent values 124 representing amounts paid to the employee for previous months are accessed (e.g., between, and including, January 2022 through November 2022).

At step 222, a time period for the configurable window 132 is selected to include February 2022 through August 2022. Notably, here fewer recent values are selected than are available. In certain embodiments, less than all available recent values are selected to reduce the number of duplicate values in the set of values (e.g., it is likely that the price of an item is the same over multiple months, thus, selection of the recent values may select only one month with this price, which is consistent over multiple months). In certain embodiments, less than all available recent values are selected to reduce processing time when using method 200 to detect errors in numeric data. In particular, an optimal set cardinality may need to be set to adhere to constraints on processing time, where such constraints exist. In certain embodiments, the selected subset of recent values does not include one or more of the most recent, recent values (e.g., in this example, does not include October 2022 and November 2022) due to a training cadence of classifier model 116. For example, a classifier model 116 re-trained every three months, may not be trained to classify values between today and up to three months ago, based on how long the model has been deployed since its last re-training cycle. As such, the selected recent values may not be the most recent values for the data field.

At step 223, recent values 124 are selected within the time period. This includes selecting recent values 124 between February 2022 and August 2022.

Returning to the description of FIGS. 2A and 2B, method 200 then proceeds to step 225, with computing one or more statistics (e.g., 128 in FIG. 1) for the selected recent values 124.

For this example, statistics computed for the selected recent values include at least a mean of $1,392, a median of $1,211, and a minimum value of $1,200. In other examples, one or more of these statistics may or may not be calculated.

Method 200 then proceeds to step 230 by creating a second vector based on the one or more statistics (e.g., 128 in FIG. 1) and the string value (e.g., 122 in FIG. 1). In the example workflow illustrated in FIG. 2B, creating the second vector is illustrated at step 231.

Specifically with respect to FIG. 2B, at step 231, the one or more statistics may be compared against input value 122 to generate various ratios (e.g., 130 in FIG. 1), such as mean ratio, median ratio, and others. These ratios are then used to create the second vector.

Although steps 220, 225, and 230 are illustrated as being performed subsequent to step 215 in FIG. 2A, in certain embodiments, these steps are performed in parallel or in another order such that both the first vector and second vector are generated, as described above.

Returning to the description of FIGS. 2A and 2B, method 200 then proceeds to step 235 with generating a concatenated vector by concatenating the first vector (e.g., generated at step 215) and the second vector (e.g., created at step 230).

Method 200 then proceeds to step 240 with processing the concatenated vector, with a classifier model (e.g., classification model 116 of FIG. 1) configured to classify the string value (e.g., 122 in FIG. 1) as valid or invalid, and thereby generating a classification output. The classification output may indicate that the string value is valid, or in other words, that the string value is predicted to be an accurate value. Alternatively, the classification output may indicate that the string value is invalid, or in other words, that the string value is predicted to be an inaccurate value.

In certain embodiments, method 200 proceeds to step 245 by taking action(s) based on the classification output. For example, further action may be taken based on the classification output indicate that the string value is invalid.

In certain embodiments, when the string value is determined to be invalid, actions taken include providing the classification output for the string value (e.g., indicating that this input is invalid) to the user which the input string value. Informing the user may prompt the user to fix the invalid value by re-entering a valid string value for the data field. In certain embodiments, when the string value is determined to be invalid, actions taken include correcting the string value. Correction of the string value may be based, at least in part, on the plurality of reference values (e.g., 124 in FIG. 1). For example, where it is determined that the string value is incorrect due to the user inadvertently striking two keys at the same time with one finger when entering the string value, the string value may be corrected to remove the additional character which was not intended to be entered by the user.

Method 200 may be thus performed to detect errors in numerical data. Beneficially, detecting an error in numeric data at the input stage allows for efficient correction and the avoidance of further processing based on the faulty input data. Accordingly method 200 has the beneficial technical effects of saving compute cycles that would otherwise be expended on faulty numeric data, decreasing overall processing time by avoiding propagation of faulty numeric data, improved user experience by providing the user with meaningful information at the point of data entry, and more generally, the avoidance of various bad outcomes as described above.

Example Method for Training Machine Learning Models to Detect Errors in Numerical Data FIGS. 3A-3C illustrate an example method 300 for training machine learning models to detect errors in numerical data. Method 300 may be performed to train context embedding model 114 of FIG. 1 and classifier model 116 in FIG. 1.

Method 300 begins, at step 305 by obtaining (e.g., by model training component 108) a plurality of training data instances. Each of the training data instances includes a training input and a training output. The training input includes a string value for a data field (e.g., 122 in FIG. 1) and a plurality of reference values (e.g., 124 in FIG. 1) for that data field. The string value is either a valid/accurate value previously entered for the data field or an invalid/error value for the data field. As above, invalid/error string values are synthetically generated string values (e.g., generated based on the accurate string values). The reference values for each of the training inputs (corresponding to each of the training data instances) includes valid reference values such as recent values, a valid mode value, a valid median value, a valid max value, a valid minimum value, and others. The training output of each of the training data instances is an indication that the string value of the corresponding training input is valid or invalid.

Method 300 proceeds at step 310 with training a context embedding model (e.g., 114 in FIG. 1) to classify an input string value as a valid or invalid entry and thereby generate a first vector as output using the plurality of training data instances. Training the context embedding model 114 is described in more detail in FIG. 3B. As illustrated in FIG. 3B, step 310 includes steps 350-364.

At step 350, a training data instance from the plurality of training data instances is selected. The selected training data instance may represent a valid training data instance having a valid string value or an invalid training data instance having an invalid string value. In certain embodiments, the selection of the first training data instance is random.

At step 352, a training input and a training output of the training data instance is identified.

At step 354, the training input of the selected training data instance is provided to an input layer of the context embedding model.

At step 356, an output is received from the context embedding model. The received output received classifies the input string value for the training input as valid or invalid.

At step 358, an evaluation of a similarity of the classification output to the training output of the selected training data instance is performed. For example, where the classification output indicates that the string value is valid, an evaluation is performed to determine whether the training output for this string value also indicates that the string value is, in fact valid.

At step 360, a determination of whether or not to modify one or more parameters of the context embedding model is made based on the similarity determined at step 358. In certain embodiments, the context embedding model is trained by iteratively modifying parameters of the context embedding model until its output, in response to training input, matches a corresponding training output. For example, the context embedding model's output may be compared to the training output (e.g., at step 358). The similarity of the output to the training output may be evaluated using a loss function. In certain embodiments, a binary cross entropy loss is computed for the model's output and the training output. The calculated loss may be back-propagated to update model parameters, such as weights, connections, number of hidden nodes, weight decay, activation sparsity, nonlinearity, weight initialization, random seeds, model averaging, preprocessing input data, coordinate descent, grid search, random search, and model-based optimization methods, may be modified such until the model's output matches the training output.

In certain embodiments, steps 350-360 are performed for a plurality of training data instances. For example, at step 362, method 300 proceeds with determining whether all of the plurality of training data instances have been used to train the context embedding model. Where all of the plurality of training data instances have been used to train the context embedding model, step 310 is complete. On the other hand, where all of the plurality of training data instances have not yet been used to train the context embedding model, method 300 proceeds back to step 350 to select another training data instance for training the context embedding model.

Optionally, in certain embodiments, where all of the training data instances have not yet been used to train the context embedding model, method 300 proceeds to step 364 where a determination is made as to whether or not an accuracy level has been achieved. In particular, an accuracy score that represents the likelihood that the output of the context embedding model is correct and will provide an accurate probability prediction is calculated. This accuracy score may be calculated based on the similarity of the classification output to the training output. Where the accuracy score is above a threshold accuracy level (e.g., predetermined and/or selected by a user), training of the context embedding model is complete. As such, where the accuracy level is achieved, step 310 is complete. Alternatively, where the accuracy level has not been achieved, method 300 proceeds back to step 350 to select another training data instance for further training of the context embedding model.

Subsequent to step 310, method 300 proceeds to step 315, illustrated in FIG. 3A. In this example, step 315 includes steps 320-335 that are performed for each of the training data instances.

For each training data instance (e.g., obtained at step 305), tt step 320, a first vector output generated using the context embedding model is extracted. The first vector output may be a vector extracted from the embedding layer of the context embedding model.

At steps 325 and 330, respectively, one or more statistics for the reference values of the corresponding training data instance are computed and a second vector is created based on the computed statistics.

At step 335, a concatenated vector is generated by concatenating the first vector and the second vector.

At step 340, a classifier model (e.g., 116 in FIG. 1) is trained to classify an input string value as valid or invalid and thereby generate a classification output using one or more of the concatenated vectors generated for each of the plurality of training data instances.

Training the classifier model is described in more detail in FIG. 3C. As illustrated in FIG. 3C, step 310 includes steps 370-384.

At step 370, a training data instance from the plurality of training data instances is selected. The selected training data instance may represent a valid training data instance or an invalid training data instance. In certain embodiments, the selection of the first training data instance is random.

At step 372, a training input of the training data instance is identified as the concatenated vector (e.g., generated for the training data instance at step 335 illustrated in FIG. 3A).

At step 374, the training input of the selected training data instance is provided to an input layer of the classifier model.

At step 376, a classification output is received from the classifier model in response to providing the training input to the model. The received classification output classifies the input string value for the training input as valid or invalid.

At step 378, an evaluation of a similarity of the classification output to the training output of the selected training data instance is performed.

At step 380, a determination of whether or not to modify one or more parameters of the classifier model is made based on the similarity determined at step 378. In certain embodiments, the classifier model is trained by iteratively modifying parameters of the classifier model until its output, in response to training input, matches a corresponding training output. For example, the classifier model's output may be compared to the training output (e.g., at step 378). The similarity of the output to the training output may be evaluated using a loss function. In certain embodiments, a binary cross entropy loss is computed for the model's output and the training output. The calculated loss may be back-propagated to update the model's parameters, and these parameters may be modified until the model's output matches the training output.

Similar to the context embedding model, in certain embodiments, steps 370-380 are performed for a plurality of training data instances. For example, at step 382, method 300 proceeds with determining whether all of the plurality of training data instances have been used to train the classifier model. Where all of the plurality of training data instances have been used to train the classifier model, step 340 is complete. On the other hand, where all of the plurality of training data instances have not yet been used to train the classifier model, method 300 proceeds back to step 370 to select another training data instance for training the classifier model.

Optionally, in certain embodiments, where all of the training data instances have not yet been used to train the classifier model, method 300 proceeds to step 384 a determination is made as to whether or not an accuracy level has been achieved. Where the calculated accuracy score is above a threshold accuracy level (e.g., pre-determined and/or selected by a user), training of the classifier model is complete. As such, where the accuracy level is achieved, step 340 is complete. Alternatively, where the accuracy level has not been achieved, method 300 proceeds back to step 370 to select another training data instance for further training of the classifier model.

Subsequent to step 340, method 300 is complete. As such, training of the context embedding model and the classifier model is complete, and these models are deployed for use in detecting errors in numerical data (e.g., to perform method 200).

Although method 300 illustrates training a context embedding model using multiple training data instances prior to training a classifier model using the multiple training data instances, in certain embodiments, the context embedding model and the classifier model are trained simultaneously. For example, a first training data instance may be used to train both the context embedding model and the classifier model to generate a classification output for the first training data instance. The generated classification output may be used to modify parameters of the context embedding model and/or the classifier model before a next training data instance is selected and used to train the models. In other words, each training data instance may be used to for end-to-end training of both models, the generated classification output for each training data instance may be evaluated using a loss function, and calculated losses, for each of the training data instances, may be back-propagated through the models to update parameters of one or both of the models.

Example Computing Device for Detecting Errors in Numeric Data

Figure 4:
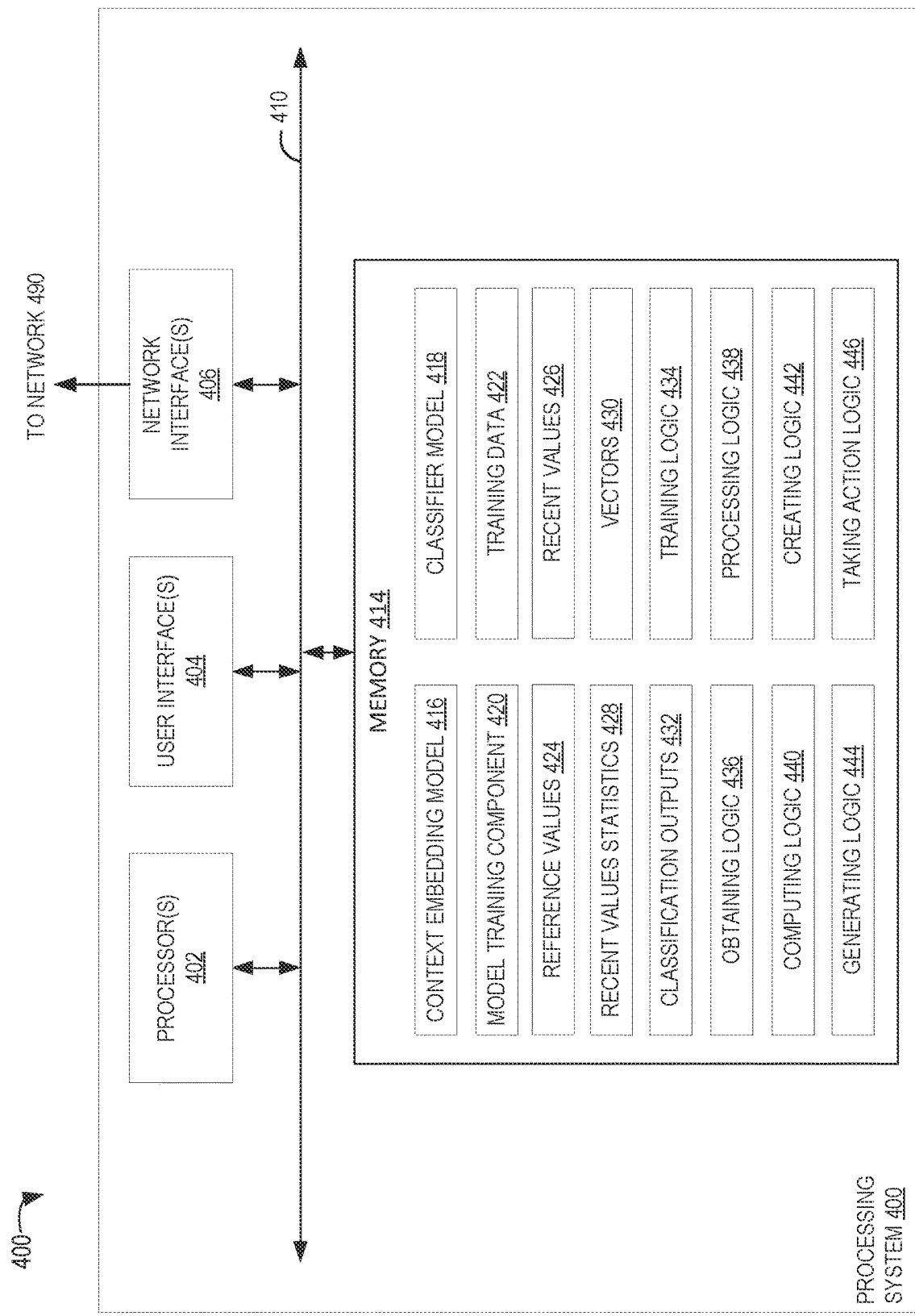
FIG. 4 illustrates an example system on which aspects of the present disclosure can be performed.

FIG. 4 depicts a block diagram of an example computing device 400 that implements various features and processes, based on the methods described herein. For example, computing device 400 may be configured to perform method 200 and/or method 300 illustrated in FIGS. 2A-2B and 3A-3C, respectively.

Computing device 400 is implemented on any electronic device that runs software applications derived from complied instructions, including without limitation, personal computers, servers, smart phones, media players, electronic tablets, game consoles, email devices, etc. In certain embodiments, computing device 400 includes one or more processors 402, one or more user interfaces 404, one or more network interfaces 406 through which computing device 400 is connected to network 490 (which may be a local network, an intranet, the internet, or any other group of computing devices communicatively connected to each other), and memory 414.

Each of these components may be coupled by a bus 410. Bus 410 includes any internal or external bus technology, including but not limited to, ISA, EISA, PCI, PCI Express, USB, Serial ATA or FireWire.

Processor(s) 402 may retrieve and execute programming instructions stored in the memory 414. Similarly, processor(s) 402 may retrieve and store application data residing in the memory 4014 Bus 410 transmits programming instructions and application data, among the processor(s) 402, network interface(s) 406, and memory 414. In certain embodiments, processor(s) 402 is included to be representative of a single CPU/GPU/TPU/machine learning accelerator, multiple CPUs/GPUs/TPUs/machine learning accelerators, a single CPU/GPU/TPU/machine learning accelerator having multiple processing cores, and/or the like.

User interface(s) 404 may include any device, mechanism, system, interactive display, and/or various other hardware components for communicating information between computing device 400 and a user of computing device 400. For example, user interface(s) 404 04 may include input hardware, such as a keyboard, touch screen, button, microphone, and/or other device for receiving inputs from the user. User interface(s) 404 may further include display hardware, such as, for example, a monitor, a video card, and/or other another device for sending and/or presenting visual data to the user. In certain embodiments, user interface(s) 404 is a graphical user interface.

Network interface(s) 406 provides computing device 400 with access to external networks, such as network 490, and thereby external processing systems and/or computing devices. Network interface(s) 406 can be any device capable of transmitting and/or receiving data via network 490. Accordingly, network interface(s) 406 can include a communication transceiver for sending and/or receiving any wired and/or wireless communication. For example, Network interface(s) 406 may include an antenna, a modem, LAN port, WiFi card, WiMAX card, mobile communications hardware, near-field communication hardware, satellite communication hardware and/or any wired or wireless hardware for communicating with other networks and/or devices/systems. In certain embodiments, network interface(s) 406 includes hardware configured to operate in accordance with the Bluetooth® wireless communication protocol.

Memory 414 is representative of a volatile memory, such as a random access memory (RAM), or a nonvolatile memory, such as nonvolatile random access memory, phase change random access memory, or the like. As shown, memory 414 includes a context embedding model 416, a classifier model 418, a model training component 4208, training data 422 (e.g., an example of training data 112 in FIG. 1), reference values 424 (e.g., an example of reference values 124 in FIG. 1), recent values 426 (e.g., an example of recent values 126 in FIG. 1), recent values statistics 428 (e.g., an example of recent value statistics 128 in FIG. 1), vectors 430 (e.g., an example of embedding vector 1, embedding vector 2, and concatenated embedding vector in FIG. 1), classification outputs 432, training logic 434, obtaining logic 436, processing logic 438, computing logic 440, creating logic 442, generating logic 444, and taking action logic 446.

In certain embodiments, context embedding model 416 is configured to generate an embedding based on its input data, such as described above with respect to FIGS. 2A-2B. Context embedding model 416 uses, as input, an input string value and a plurality of reference values corresponding to the string value to generate a first vector. In certain embodiments, context embedding model 416 is an example of context embedding model 114 in FIG. 1.

In certain embodiments, classifier model 418 is configured to classify an input string value as a valid or invalid entry, such as described above with respect to FIGS. 2A-2B. Classifier model 418 may use, as input, a concatenated vector generated for an input string value to generate a classification output classifying the string value as valid/invalid. In certain embodiments, classifier model 418 is an example of classifier model 116 in FIG. 1.

In certain embodiments, model training component 420 is configured to train context embedding model 114 and/or classifier model 116, such as described above with respect to FIGS. 3A-3C. In certain embodiments, model training component 420 is an example of model training component 108 in FIG. 1.

In certain embodiments, training logic 434 includes logic for training context embedding model 114 to generate a first vector as output using a plurality of training data instances. In certain embodiments, training logic 434 includes logic for training classifier model 116 to classify an input string value as valid or invalid and thereby generate a classification output using concatenated vectors generated for each of a plurality of training data instances.

In certain embodiments, obtaining logic 436 includes logic for obtaining a plurality of reference values associated with a data field. In certain embodiments, obtaining logic 436 includes logic for obtaining a plurality of recent values previously entered into a data field within a time period.

In certain embodiments, processing logic 438 includes logic for processing, with a context embedding model 114 configured to classify an input string value as valid or invalid, the string value and a plurality of reference values and thereby generate a first vector as output. In certain embodiments, processing logic 438 includes logic for processing with a classifier model 116 configured to classify a string value as valid or invalid, a concatenated vector and thereby generate a classification output.

In certain embodiments, computing logic 440 includes logic for computing one or more statistics for a plurality of recent values. In certain embodiments, computing logic 440 includes logic for computing one or more ratios using a string value and one or more statistics.

In certain embodiments, creating logic 442 includes logic for creating a second vector based on statistics and a string value or ratios.

In certain embodiments, generating logic 444 includes logic for generating a concatenated vector by concatenating a first vector and a second vector.

In certain embodiments, taking action logic 446 includes logic for taking one or more actions based on a classification output.

Note that FIG. 4 is just one example of a computing device consistent with aspects described herein, and other computing devices having additional, alternative, or fewer components are possible consistent with this disclosure.

Example Clauses

Implementation details of various aspects of the present disclosure are described in the following numbered clauses.

Clause 1: A method of detecting data entry errors, comprising: receiving a string value as user input for a data field; obtaining a plurality of reference values associated with the data field; processing, with a context embedding model configured to classify an input string value as valid or invalid, the string value and the plurality of reference values and thereby generating a first vector as output; obtaining a plurality of recent values previously entered into the data field within a time period; computing one or more statistics for the plurality of recent values; creating a second vector based on the one or more statistics and the string value; generating a concatenated vector by concatenating the first vector and the second vector; processing, with a classifier model configured to classify the string value as valid or invalid, the concatenated vector and thereby generating a classification output; and taking one or more actions based on the classification output.

Clause 2: The method of Clause 1, wherein the one or more actions comprise at least one of: providing the classification output to a user that provided the string value as the user input; or correcting the string value based, at least in part, on the plurality of reference values.

Clause 3: The method of any one of Clauses 1-2, wherein the string value, the plurality of reference values, and the plurality of recent values are associated with at least one of a same person, a same company, or a same item.

Clause 4: The method of any one of Clauses 1-3, wherein the context embedding model comprises a character-level convolutional neural network (CNN).

Clause 5: The method of Clause 4, wherein the character-level CNN comprises a one-dimensional CNN.

Clause 6: The method of any one of Clauses 4-5, wherein the first vector is extracted from an embedding layer of the character-level CNN.

Clause 7: The method of any one of Clauses 1-6, wherein creating the second vector based on the one or more statistics and the string value comprises: computing one or more ratios using the string value and each of the one or more statistics; and creating the second vector based on the one or more ratios.

Clause 8: The method of any one of Clauses 1-7, wherein the classifier model comprises a gradient boosting classifier model.

Clause 9: The method of any one of Clauses 1-8, wherein the classification output comprises an indication of a probability that the string value is valid or invalid.

Clause 10: The method of any one of Clauses 1-9, wherein the string value comprises a text input to the data field of a graphical user interface.

Clause 11: The method of any one of Clauses 1-10, further comprising selecting the time period based on a training cadence of the context embedding model.

Clause 12: A method for training machine learning models to detect data entry errors, comprising: obtaining a plurality of training data instances, wherein each of the plurality of training data instances comprises: a training input comprising a string value and a plurality of reference values, wherein the string value comprises an accurate value previously entered for a data field or an error value for the data field; a training output comprising an indication that the string value is valid or invalid; training a context embedding model to classify an input string value as valid or invalid and thereby generate a first vector as output using the plurality of training data instances; for each training data instance of the plurality of training data instances: extracting the first vector generated using the context embedding model; computing one or more statistics for the plurality of reference values of the corresponding training data instance; creating a second vector based on the one or more statistics; and generating a concatenated vector by concatenating the first vector and the second vector; and training a classifier model to classify the input string value as valid or invalid and thereby generate a classification output using one or more of the concatenated vectors generated for each of the plurality of training data instances.

Clause 13: The method of Clause 12, further comprising synthetically generating the error value for the data field using the string value.

Clause 14: The method of any one of Clauses 12-13, wherein the string value and the plurality of reference values of the training input for each of the plurality of training data instances are associated with at least one of a same person, a same company, or a same item.

Clause 15: The method of any one of Clauses 12-14, wherein the context embedding model comprises a character-level convolutional neural network (CNN).

Clause 16: The method of Clause 15, wherein the first vector is extracted from an embedding layer of the character-level CNN.

Clause 17: The method of any one of Clauses 12-16, wherein, for each of the plurality of training data instances, creating the second vector based on the one or more statistics comprises: computing one or more ratios using the string value of the corresponding training data instance and each of the one or more statistics; and creating the second vector based on the one or more ratios.

Clause 18: The method of any one of Clauses 12-17, wherein the classifier model comprises a gradient boosting classifier.

Clause 19: The method of any one of Clauses 12-18, wherein the classification output comprises an indication of a probability that the string value is valid or invalid.

Clause 20: A processing system, comprising: a memory having executable instructions stored thereon; and a processor configured to execute the executable instructions to cause the processing system to perform the operations of any one of Clauses 1 through 19.

Clause 21: A processing system, comprising: means for performing the operations of any one of Clauses 1 through 19.

Clause 22: A computer-readable medium having executable instructions stored thereon which, when executed by a processor, causes the processor to perform the operations of any one of clauses 1 through 19.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a–b, a–c, b–c, and a–b–c, as well as any combination with multiples of the same element (e.g., a–a, a–a–a, a–a–b, a–a–c, a–b–b, a–c–c, b–b, b–b–b, b–b–c, c–c, and c–c–c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various steps of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are steps illustrated in figures, those steps may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method of detecting data entry errors, comprising:
   receiving a string value as user input for a data field, the string value comprising a string of first numbers associated with at least one of a person, a company, or an item;
   obtaining a plurality of reference values associated with the data field, wherein:
      the plurality of reference values are each based on values previously entered for the data field that are associated with at least one of the person, the company, or the item associated with the string value, and the plurality of reference values comprise second numbers;
   processing, with a context embedding model configured to classify an input string value as valid or invalid, the string value and the plurality of reference values, wherein the context embedding model comprises a neural network comprising a plurality of interconnected nodes, organized into a plurality of layers, used to process the string value and the plurality of reference values;
   extracting, from an intermediate layer of the plurality of layers of the context embedding model, a first vector, wherein the first vector comprises a reduced dimensionality embedding of the string value and the plurality of reference values;
   obtaining a plurality of recent values previously entered into the data field within a time period, wherein:
      the plurality of recent values are each associated with at least one of the person, the company, or the item associated with the string value; and
      the plurality of recent values comprise third numbers;
   computing one or more statistics for the plurality of recent values, wherein the one or more statistics comprise at least one of a mean value, a median value, a mode value, a maximum value, or a minimum value;
   computing one or more ratios based on the string value and the one or more statistics;
   creating a second vector comprising the one or more ratios;
   generating a concatenated vector by concatenating the first vector and the second vector;
   processing, with a classifier model configured to classify the string value as valid or invalid, the concatenated vector and thereby generating a classification output; and
   generating the classification output for display on a computing device of a user.

2. The computer-implemented method of claim 1, wherein:
   the classification output classifies the string value as invalid, and
   the method further comprises correcting the string value using the plurality of reference values based on the classification output classifying the string value as invalid.

3. The computer-implemented method of claim 1, wherein the context embedding model comprises a character-level convolutional neural network (CNN).

4. The computer-implemented method of claim 3, wherein the character-level CNN comprises a one-dimensional CNN.

5. The computer-implemented method of claim 1, wherein the classifier model comprises a gradient boosting classifier model.

6. The computer-implemented method of claim 1, wherein the classification output comprises an indication of a probability that the string value is valid or invalid.

7. The computer-implemented method of claim 1, wherein the string value comprises a text input to the data field of a graphical user interface.

8. The computer-implemented method of claim 1, further comprising selecting the time period based on a training cadence of the context embedding model.

9. A computer-implemented method for training machine learning models to detect data entry errors, comprising:
   obtaining a plurality of training data instances, wherein each of the plurality of training data instances comprises:
      a training input comprising a string value and a plurality of reference values, wherein the string value comprises an accurate value previously entered for a data field or an error value for the data field, wherein:
         the string value comprises a string of first numbers associated with at least one of a person, a company, or an item, and
         the plurality of reference values comprise second numbers that are associated with at least one of the person, the company, or the item associated with the string value; and
      a training output comprising an indication that the string value is valid or invalid;
   training a context embedding model to classify an input string value as valid or invalid using the plurality of training data instances, wherein the context embedding model comprises a neural network comprising a plurality of interconnected nodes, organized into a plurality of layers, used to process the plurality of training data instances;

for each respective training data instance of the plurality of training data instances:
  extracting, from an intermediate layer of the plurality of layers of the context embedding model, a first vector generated for the respective training data instance, wherein the first vector comprises a reduced dimensionality embedding of the string value and the plurality of reference values of the respective training data instance;
  computing one or more statistics for the plurality of reference values of the respective training data instance, wherein the one or more statistics comprise at least one of a mean value, a median value, a mode value, a maximum value, or a minimum value;
  computing one or more ratios based on the string value of the respective training data instance and the one of the one or more statistics;
  creating a second vector comprising the one or more ratios; and
  generating a concatenated vector by concatenating the first vector and the second vector; and training a classifier model to classify the input string value as valid or invalid and thereby generate a classification output using one or more of the concatenated vectors generated for each of the plurality of training data instances.

10. The computer-implemented method of claim 9, further comprising synthetically generating the error value for the data field using the string value.

11. The computer-implemented method of claim 9, wherein the context embedding model comprises a character-level convolutional neural network (CNN).

12. The computer-implemented method of claim 9, wherein the classifier model comprises a gradient boosting classifier.

13. The computer-implemented method of claim 9, wherein the classification output comprises an indication of a probability that the string value is valid or invalid.

14. An apparatus, comprising:
  a memory comprising computer-executable instructions; and
  a processor in data communication with the memory and configured to execute the computer-executable instructions and cause the apparatus to perform a computer-implemented method for detecting data entry errors, the computer-implemented method comprising:
    receiving a string value as user input for a data field, the string value comprising a string of first numbers associated with at least one of a person, a company, or an item;
    selecting a plurality of reference values previously entered into the data field within a time period, wherein:
      the plurality of reference values are each based on values previously entered for the data field that are associated with at least one of the person, the company, or the item associated with the string value, and
      the plurality of reference values comprise second numbers;
    processing, with a context embedding model configured to classify an input string value as valid or invalid, the string value and the plurality of reference values, wherein the context embedding model comprises a neural network comprising a plurality of interconnected nodes, organized into a plurality of layers, used to process the string value and the plurality of reference values;
    extracting, from an intermediate layer of the plurality of layers of the context embedding model, a first vector, wherein the first vector comprises a reduced dimensionality embedding of the string value and the plurality of reference values
    computing one or more statistics for the plurality of reference values and the string value, wherein the one or more statistics comprise at least one of a mean value, a median value, a mode value, a maximum value, or a minimum value;
    computing one or more ratios based on the string value and the one or more statistics;
    creating a second vector comprising the one or more ratios;
    generating a concatenated vector by concatenating the first vector and the second vector;
    processing, with a classifier model configured to classify the string value as valid or invalid, the concatenated vector and thereby generating a classification output; and
    generating the classification output for display on a computing device of a user.

* * * * *